United States Patent
Perse et al.

(10) Patent No.: US 10,604,267 B2
(45) Date of Patent: Mar. 31, 2020

(54) TURBINE ENGINE INCLUDING A THERMAL PROTECTION MEMBER

(71) Applicant: Safran Aircraft Engines, Paris (FR)

(72) Inventors: Erwan Pierre Antoine Perse, Moissy-Cramayel (FR); Laurent Donatien Behaghel, Moissy-Cramayel (FR); Stephane Geyl, Moissy-Cramayel (FR); Yvan Yoann Guezel, Moissy-Cramayel (FR); Cécile Thiriet, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 391 days.

(21) Appl. No.: 15/513,065

(22) PCT Filed: Sep. 21, 2015

(86) PCT No.: PCT/FR2015/052524
§ 371 (c)(1),
(2) Date: Mar. 21, 2017

(87) PCT Pub. No.: WO2016/046482
PCT Pub. Date: Mar. 31, 2016

(65) Prior Publication Data
US 2017/0291713 A1 Oct. 12, 2017

(30) Foreign Application Priority Data
Sep. 22, 2014 (FR) .................................... 14 58900

(51) Int. Cl.
*B64D 27/26* (2006.01)
*F01D 21/04* (2006.01)
(Continued)

(52) U.S. Cl.
CPC ............. *B64D 27/26* (2013.01); *B64D 27/18* (2013.01); *F01D 21/045* (2013.01); *F02C 7/20* (2013.01);
(Continued)

(58) Field of Classification Search
CPC ............. B64D 27/26; B64D 2027/262; B64D 2027/266; B64D 2027/268; F02C 7/20; F02C 7/25
See application file for complete search history.

(56) References Cited

U.S. PATENT DOCUMENTS

2003/0111238 A1 6/2003 Anderson
2005/0269446 A1* 12/2005 Dron ...................... B64D 27/26
244/54

(Continued)

FOREIGN PATENT DOCUMENTS

FR 1 113 172 A 3/1956
FR 2 941 673 A1 8/2010
(Continued)

*Primary Examiner* — William H Rodriguez
*Assistant Examiner* — Thomas P Burke
(74) *Attorney, Agent, or Firm* — Blank Rome LLP

(57) ABSTRACT

A turbine engine includes an element (3), comprising a wall (11) and at least one load-bearing member (17) extending substantially perpendicularly relative to the wall (11), with said member (17) being intended to be attached onto a mounting (18) used for the attachment thereof onto an aircraft structural part. A thermal protection member (23) surrounds said member (17), with said thermal protection member (23) including a base flexibly supported on the wall (11) of the element (3), with said base matching the shape of said wall and at least one covering part which surrounds said load-bearing member.

8 Claims, 6 Drawing Sheets

(51) Int. Cl.
*F02C 7/25* (2006.01)
*F02C 7/20* (2006.01)
*B64D 27/18* (2006.01)

(52) U.S. Cl.
CPC .......... *F02C 7/25* (2013.01); *B64D 2027/266* (2013.01); *B64D 2027/268* (2013.01); *Y02T 50/672* (2013.01)

(56) References Cited

U.S. PATENT DOCUMENTS

| | | | | |
|---|---|---|---|---|
| 2006/0000944 | A1* | 1/2006 | Dron | B64D 27/20 244/54 |
| 2007/0138337 | A1* | 6/2007 | Audart-Noel | B64D 27/26 244/53 R |
| 2013/0305817 | A1* | 11/2013 | Magnin | B64D 27/26 73/117.03 |
| 2014/0077027 | A1* | 3/2014 | Durand | B64D 27/26 244/54 |
| 2014/0102114 | A1* | 4/2014 | Demoulin | F02C 7/20 60/797 |

FOREIGN PATENT DOCUMENTS

| | | |
|---|---|---|
| FR | 2 952 614 A1 | 5/2011 |
| FR | 2 996 823 A1 | 4/2014 |
| WO | WO 2008/086513 A1 | 7/2008 |

\* cited by examiner

TURBINE ENGINE INCLUDING A THERMAL PROTECTION MEMBER

The present invention relates to a turbine engine, such as an aircraft turbojet engine or a turboprop engine.

A turbine engine is for example attached under a wing of an aircraft through an engine strut and suspension means. The suspension means conventionally comprise an upstream portion and a downstream portion, so as to distribute the stress between the upstream and the downstream of the turbine engine. The upper portion of the suspension means is generally attached at a so-called intermediate casing while the downstream portion of the suspension means is generally attached at a so-called exhaust casing.

The patent application FR 2952614 in the name of the Applicant, discloses a turbine engine attached to an engine strut of an aircraft, through front and rear suspension means, respectively attached to the intermediate casing and the exhaust casing, with the front and rear suspension means each comprising a beam partially matching the shape of a shroud of the casing concerned, with such beam being also known as a "yoke". More particularly, each casing comprises a first and a second yokes, also called main yokes, and a third yoke, also called an auxiliary yoke. The auxiliary yoke is located circumferentially between the two main yokes. The main yokes are attached to the beam through connecting rods and shafts, with said main yokes being intended to take up all the stress applied between the strut and the casing concerned, during the normal operation of the turbine engine. The auxiliary yoke is clearance mounted on the beam, through a shaft, so that the auxiliary yoke is adapted to take up all or part of the stress applied between the engine strut and the casing concerned, only when the casing is deformed and/or when at least one of the main yokes breaks.

In case of fire, for example due to a fuel or oil leakage, the main and auxiliary yokes can be subjected to high thermal forces, which could affect the mechanical strength thereof.

The invention more particularly aims at providing a simple, efficient and cost-effective solution to this problem.

For this purpose, it provides for a turbine engine, such as for example an aircraft turbojet engine or a turboprop engine, comprising at least one element comprising a wall, at least a first yoke, also called a main yoke, for example attached to the beam used for fixing the engine onto an engine of an aircraft, and at least a second yoke, also called an auxiliary yoke, clearance mounted for example on the beam, with said yokes extending substantially perpendicularly to said wall, with said auxiliary yoke being adapted to take up forces in case of deformation of the element and/or in case of breakage of the main yoke, characterized in that it comprises a thermal protection member surrounding the auxiliary yoke only, with said thermal protection member comprising a base flexibly supported on the wall of the element, with said base matching the shape of said wall and at least one covering part which surrounds said auxiliary yoke.

The flexible support of the base means that said base is capable of slightly deforming to fit the shape of the wall which it bears on.

The thermal protection member can thus be pressed, at one end, onto the wall of the element and at the other end, onto said beam, with the thermal protection member also surrounding the corresponding yoke so as to efficiently protect it against a possible exposure to fire. Any mechanical damage to the yoke is thus avoided.

A continuous and relatively tight bearing of the protective member is thus provided on the wall of the element, by matching at best the shapes of the corresponding bearing surfaces.

The function of the protection member is thus ensured, in spite of the relative movements of the beam with respect to the yokes, for example. Besides, such a flexibility facilitates the mounting and dismounting of the protection member, and allows an inspection using an endoscope.

Additionally, any degradation of the mechanical characteristics of the auxiliary yoke is avoided, by preventing any exposure of such yoke to fire. The safety function provided by the yoke is thus unaffected.

In addition, the element may comprise a first yoke and a second yoke, also called main yokes and attached to said beam, and a third yoke, called an auxiliary yoke, clearance mounted on said beam and positioned circumferentially between the main yokes, with said auxiliary yoke being adapted to take up forces if the element is deformed and/or if at least one of the main yokes breaks, with the thermal protection member surrounding the auxiliary yoke only.

The thermal protection member may be attached to the shroud by means of first fastening members.

In this case, the wall may comprise a cylindrical or frustoconical external surface and at least one annular flange extending radially outwards from said external surface, with the first fastening members being attached to said external surface and/or said annular flange.

Besides, the turbine engine may include second attachment members so designed as to attach the thermal protection member on a beam used for the attachment to a structural part of an aircraft.

Moreover, the thermal protection element may be made of silicon, elastomer or any other both flexible and heat resistant material.

The element may be a casing and the wall may be an annular shroud.

The invention will be better understood other details, characteristics, and advantages of the invention will appear on reading the following description given by way of non-limiting example and with reference to the accompanying drawings, in which.

Figure 3:
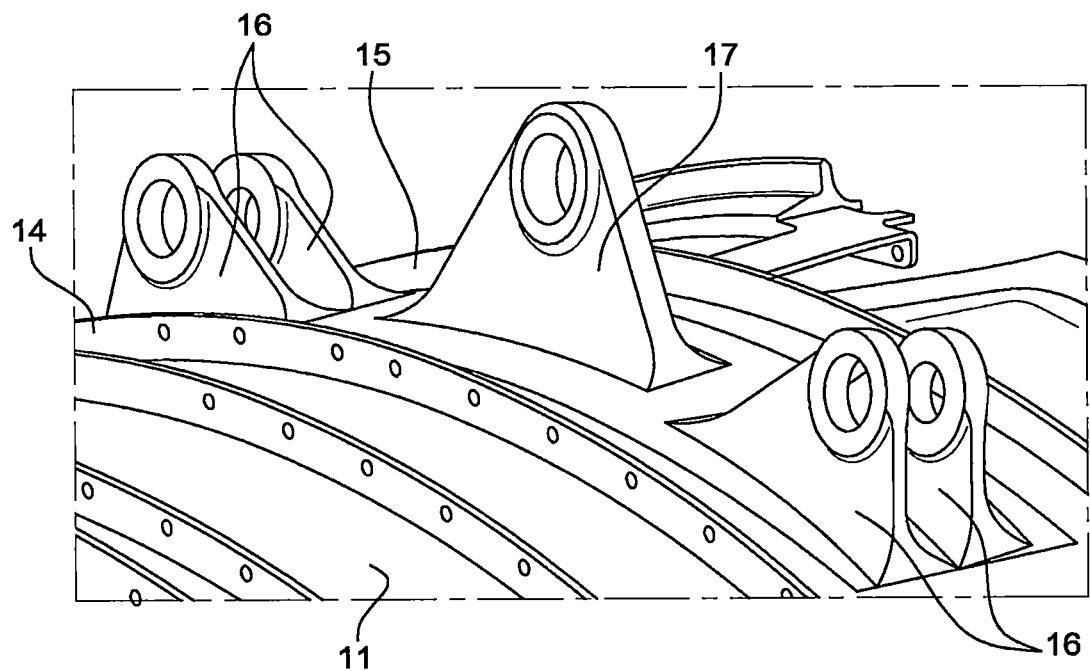
Figure 4:
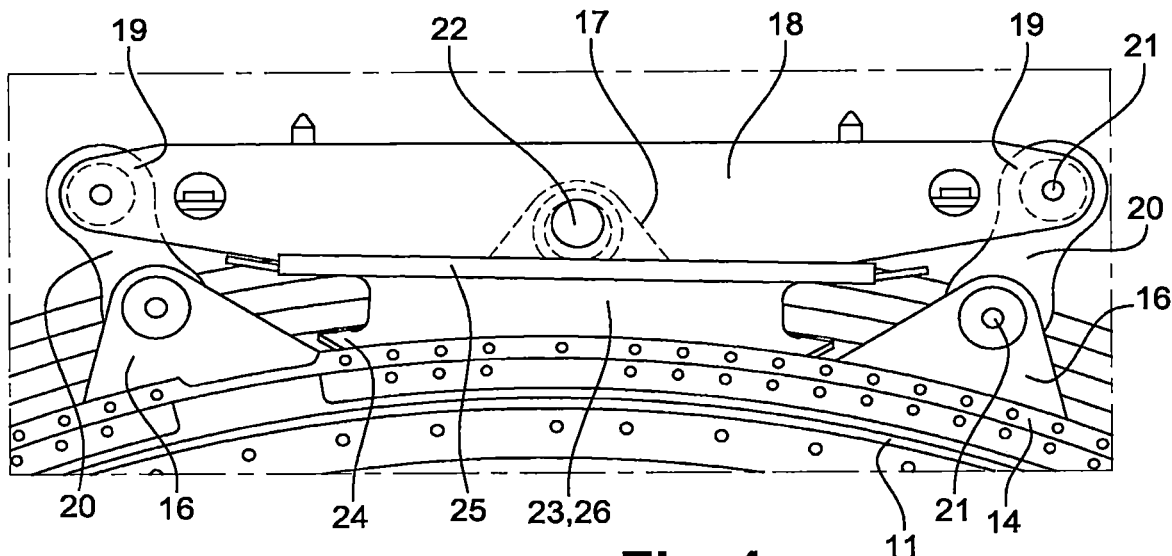
Figure 9:
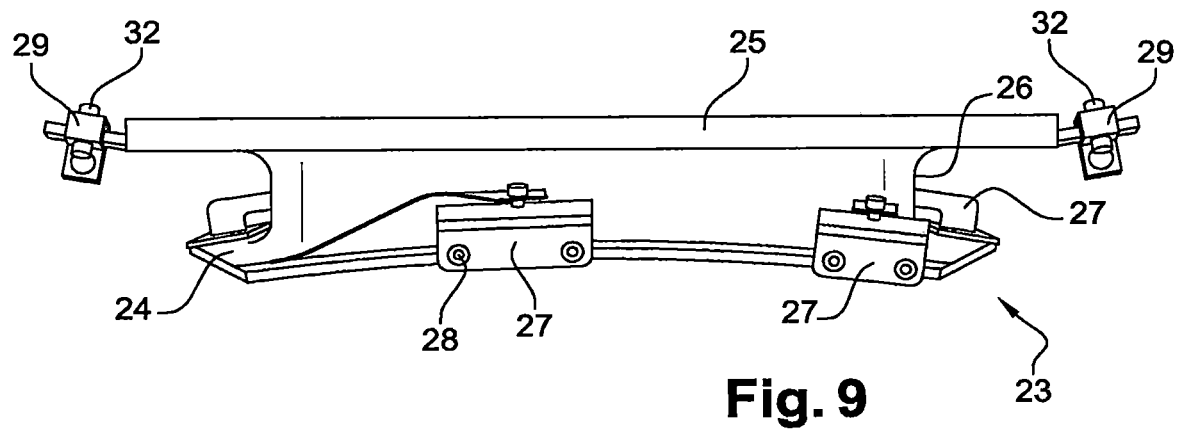
Figure 10:
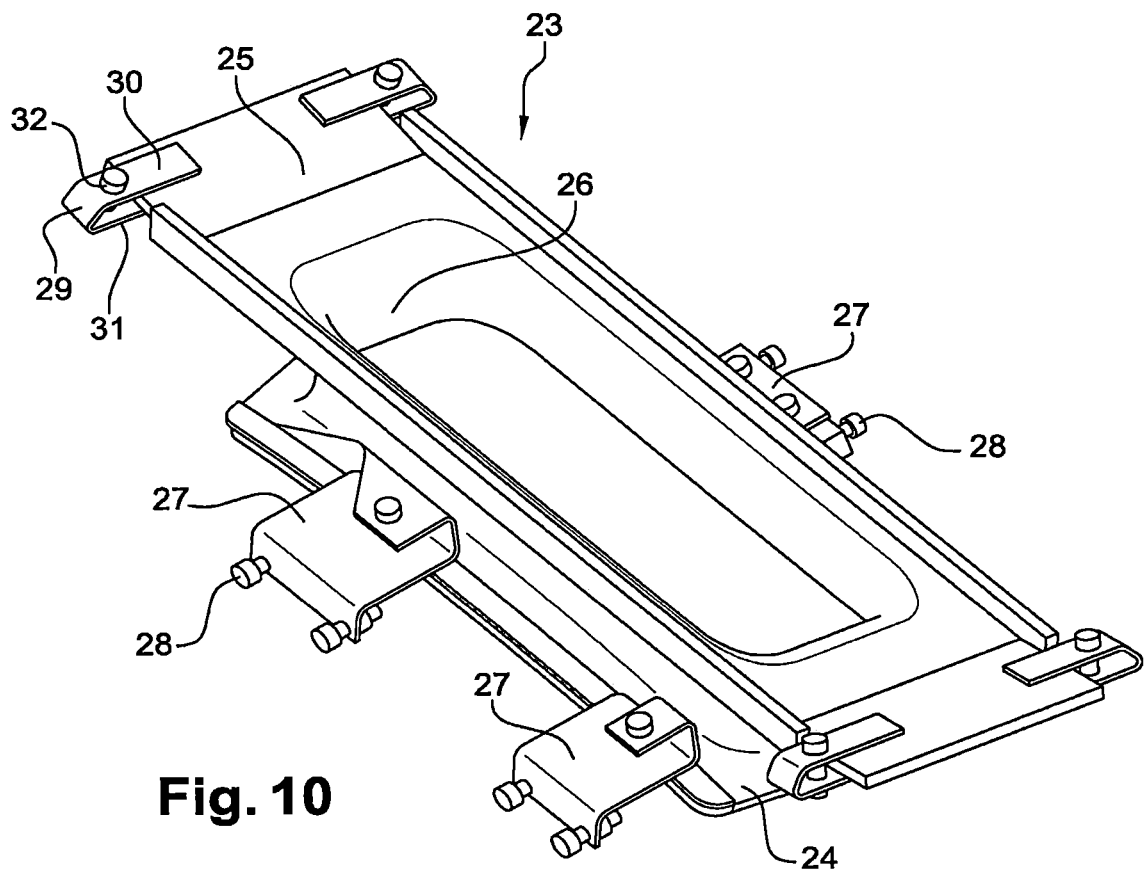
Figure 11:
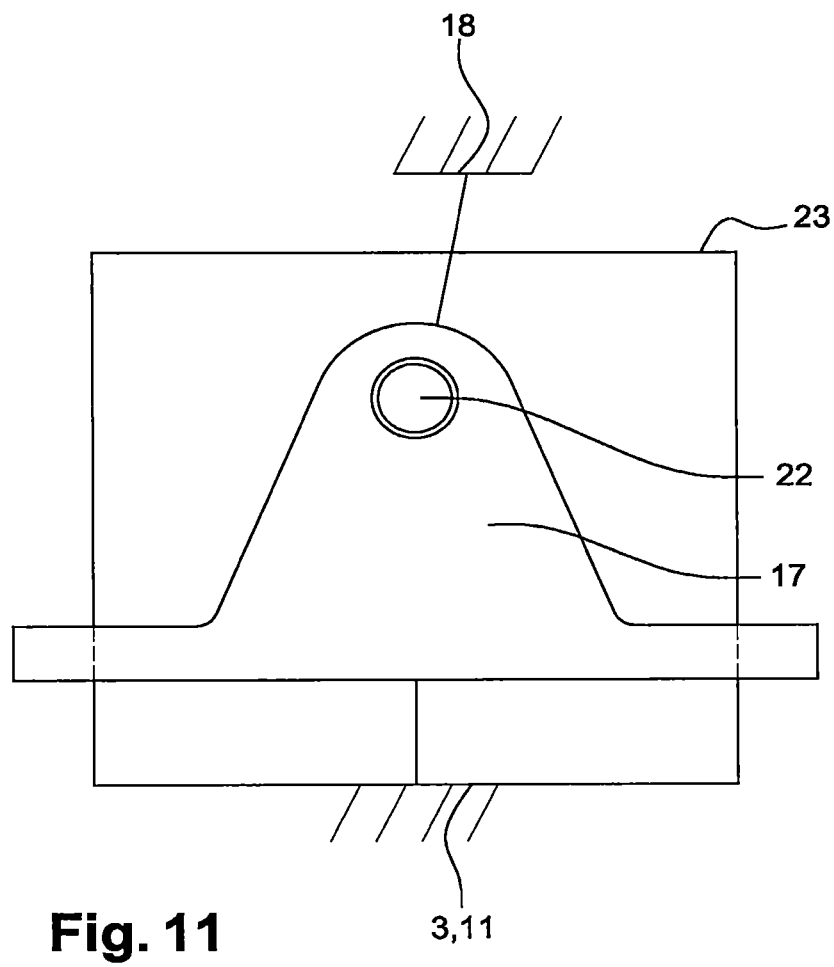

FIG. 3 is a perspective view of a part of an intermediate casing of a turbine engine according to the invention, FIG. 4 is a front view of a part of a turbine engine according to the invention, illustrating the mounting of a beam onto the intermediate casing, FIGS. 5 to 8 are perspective views each illustrating a part of the turbine engine according to the invention, FIG. 9 is a front view of a protection member and associated attachment means, FIG. 10 is a perspective view of a protection member and associated attachment means, FIG. 11 is a diagram showing the position of a protection member according to the invention.

Figure 1:
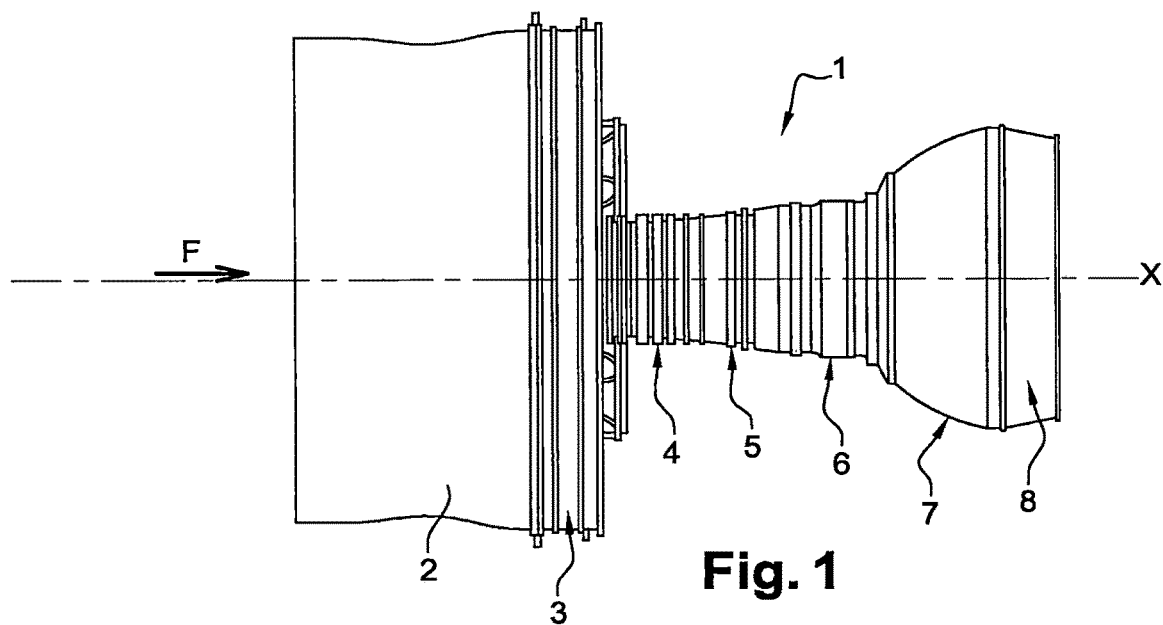
FIG. 1 is a schematic view of a turbine engine according to the invention.

A turbine engine according to one embodiment of the invention is schematically shown in FIG. 1. It takes the shape of a turbofan engine having an axis X and conventionally comprises, from in the downstream direction, i.e. in the flowing direction of the air or gas flow represented by the arrow F, a fan casing 2, a so-called intermediate casing 3, a casing 4 of the compression stages, a casing 5 of the combustion chamber, a casing 6 of the stages of the high pressure turbine, a casing 7 of the stages of the low pressure turbine and an exhaust casing 8. The intermediate casing 3 and the exhaust casing 8 are structural casings of the jet engine 1 structure, i.e. they are so arranged as to support the elements of the structure and take up and/or transmit stress.

The turbojet engine 1 hangs from the structure of an aircraft (not shown) by means of a front suspension 9 and a rear suspension 10, with said suspensions 9 and 10 being attached to a structural part of the wing (not shown) such as an engine strut or mast, which is itself integral with the structure of the aircraft.

In the detailed description that follows, the invention advantageously applies to the context of a front suspension of the turbojet. However, it can apply to other mechanical devices or other functions of the turbine engine.

Figure 2:
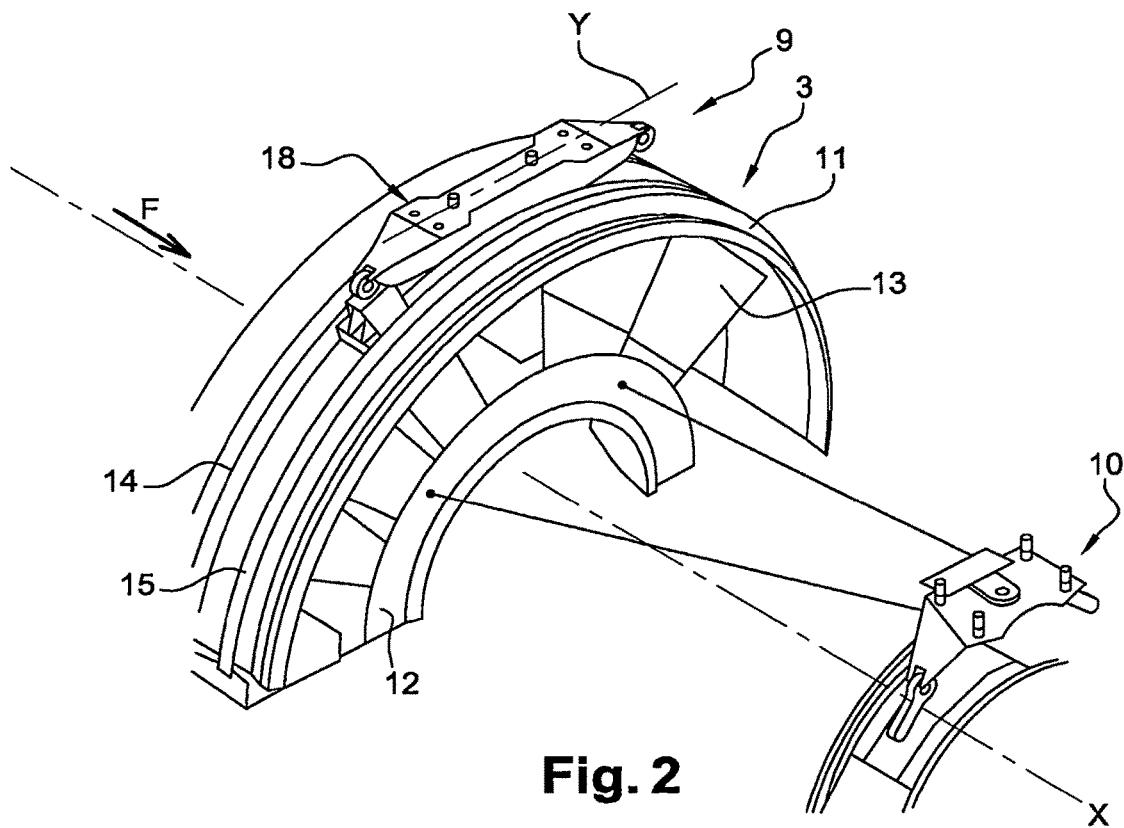
FIG. 2 is a perspective view of a part of said turbine engine.

As best shown in FIG. 2, the intermediate casing 3 comprises a radially external shroud 11 connected to a hub 12 by radial arms 13.

As illustrated in FIG. 3, the radially external shroud 11 comprises radial annular flanges 14, 15 extending radially outwards. The outer shroud 11 further comprises two pairs of yokes 16, spaced circumferentially from each other and so-called main yokes. The external shroud 11 also includes a so-called secondary yoke 17, positioned circumferentially between the pairs of main yokes 16. Each of the yokes 16 and 17 can be directly integrated, i.e. added to or bolted on, or even welded thereto.

The front suspension 9 comprises a support or a cross beam 18 extending along an axis Y perpendicular to the axis X of the turbine engine 1, with said beam 18 comprising a pair of yokes 19 at each of its lateral ends, and a central recess.

The main yokes 16 are attached to the yokes 19 by means of connecting rods 20 (FIG. 4). Besides, the auxiliary yoke 17 is mounted axially in the central recess of the beam 18. Shafts 21 are engaged in the yokes 16 and 19 and the rods 20. A shaft 22 is engaged in the yoke 17 and in holes of the beam 18 provided for this purpose.

The yokes 16, 17, 19, the connecting rods 20 and the beam 18 are so dimensioned that the main yokes 16 are able to transfer stress during the normal operation of the turbine engine and that the auxiliary yoke 17 is adapted to take up stress only in case of deformation of the casing 3 and/or in case of mechanical breakdown or malfunction of at least one of the main yokes 16. The auxiliary yoke 17 is thus clearance mounted on the beam 18.

In order to protect the auxiliary yoke 17 against a possible fire in the turbine engine 1, a thermal protection member 23 surrounds the auxiliary yoke 17. The function of this member is to ensure, under all operating conditions, the mechanical integrity of the connection between the element 3 or casing provided with a load-bearing member 17 of the yoke type, and the support 18 or beam of the structural part, with the member 17 extending substantially perpendicular to the wall 11.

In particular, the member 23 ensures the mechanical strength of a connecting part which is loaded in case of fire.

The protection member 23 is preferably made of a flexible, elastically deformable and heat resistant material. The member 23 is adapted to best fit the shape of the parts whereon it is attached, so as to act as a thermal barrier under fire or high heat conditions. In other words, the member is flexibly supported by the part. For this purpose, it is made of a material from the non-exhaustive list of flexible materials which comprises silicone rubber, elastomers, and flexible and heat resistant plastics and composite materials.

The member 23 comprises a base 24 flexibly supported by the wall 11 of element 3, with said base matching the shape of said wall and at least a covering portion 26 which surrounds and/or covers said load-bearing member. In the main application described, it has a radially inner end 24 continuously bearing on the annular shroud 11, a radially outer end 25 continuously bearing on said beam 18, and a central area 26 surrounding the auxiliary yoke 17.

More particularly, the radially inner end 24 has the shape of a cylinder portion, intended to fit the shape of the outer shroud 11 and to substantially sealingly bear on the shroud 11. Besides, the radially outer end 25 has a substantially flat shape, intended to match the shape of the radially internal surface of the beam 18 and to substantially sealingly bear on the beam 18. The central area 26 has the shape of a sleeve connecting the above-mentioned ends 24, 25.

The radially inner end 24 of the protection member 23 is attached to the external shroud 11, more preferably the annular flanges 14, 15 through first fastening members 27. The first fastening members 27 each comprise an end intended to be attached to the corresponding flange 14, 15, through screws/nuts systems 28, and a second end bearing on the end 24 of the protection member 23 so as to press it onto the surface of the radially external shroud 11. Two first fastening members 27 (FIG. 5) are positioned at an upstream edge of the protection member 23, with another first attachment member 27 being positioned at a downstream edge of the protection member 23 (FIG. 6).

Figure 5:
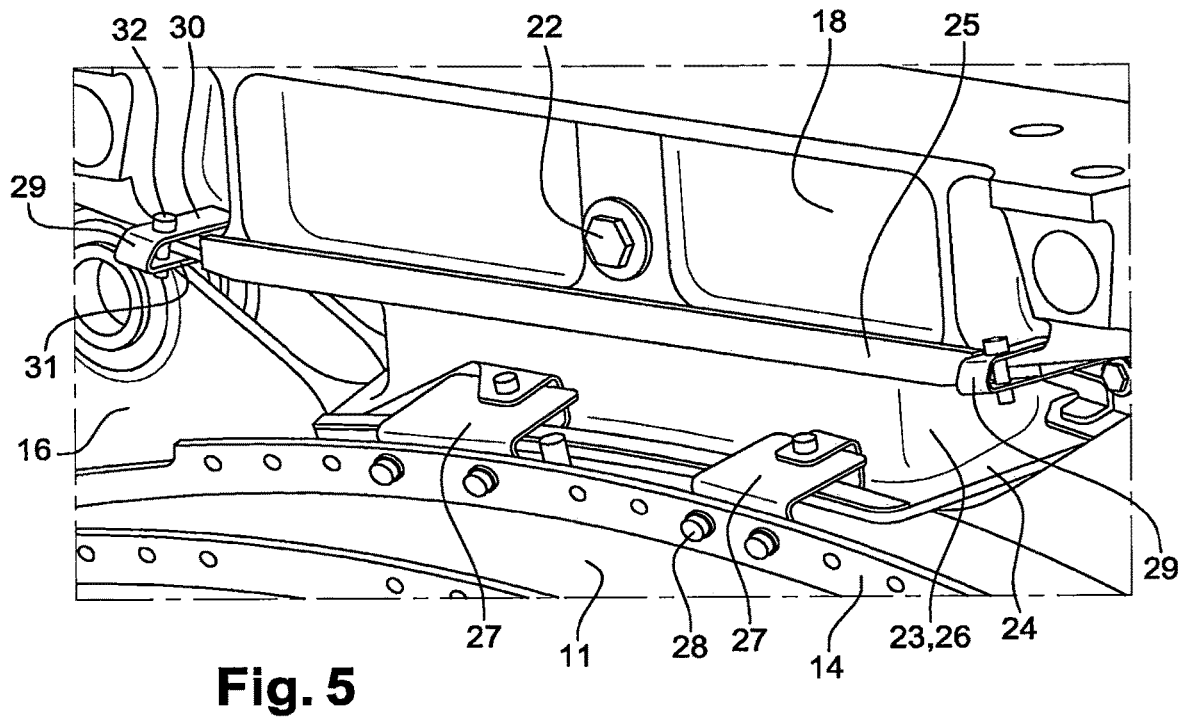
Figure 6:
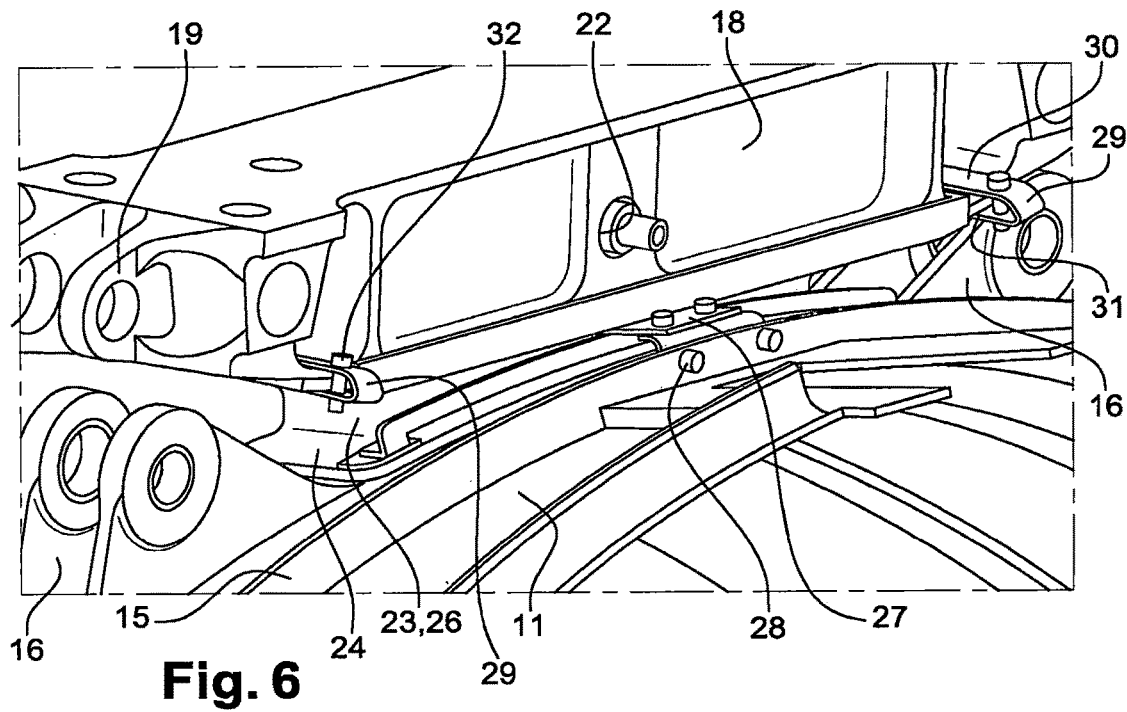
Figure 7:
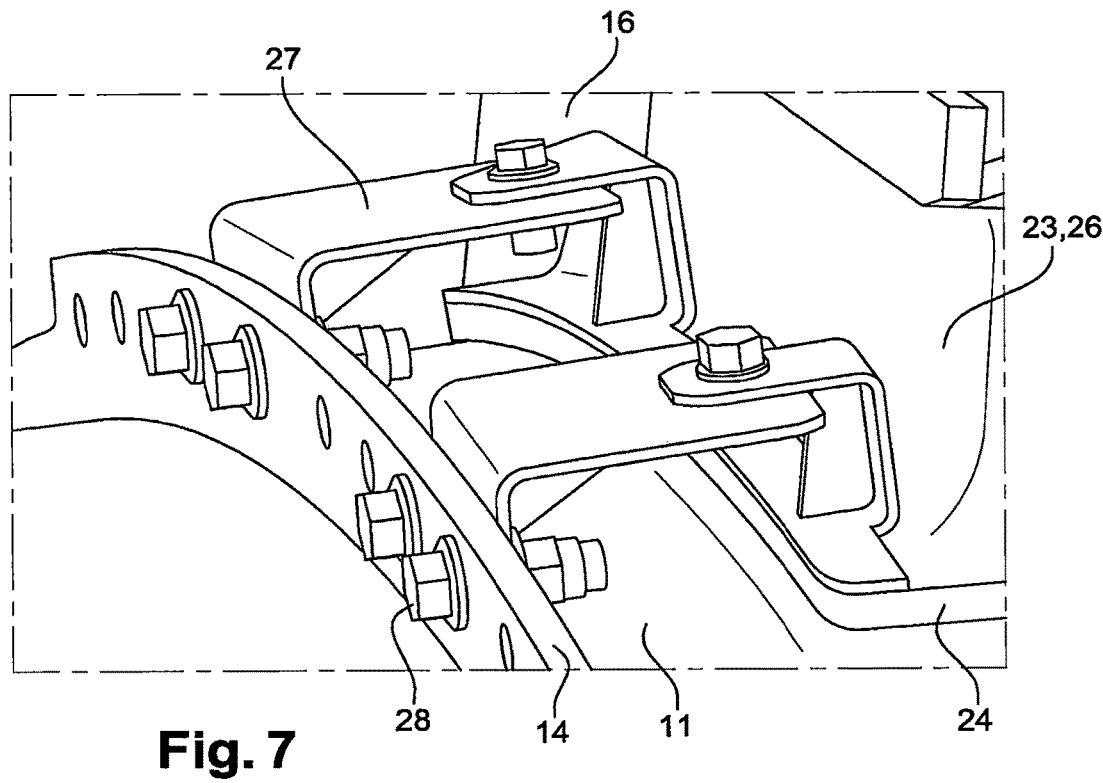
Figure 8:
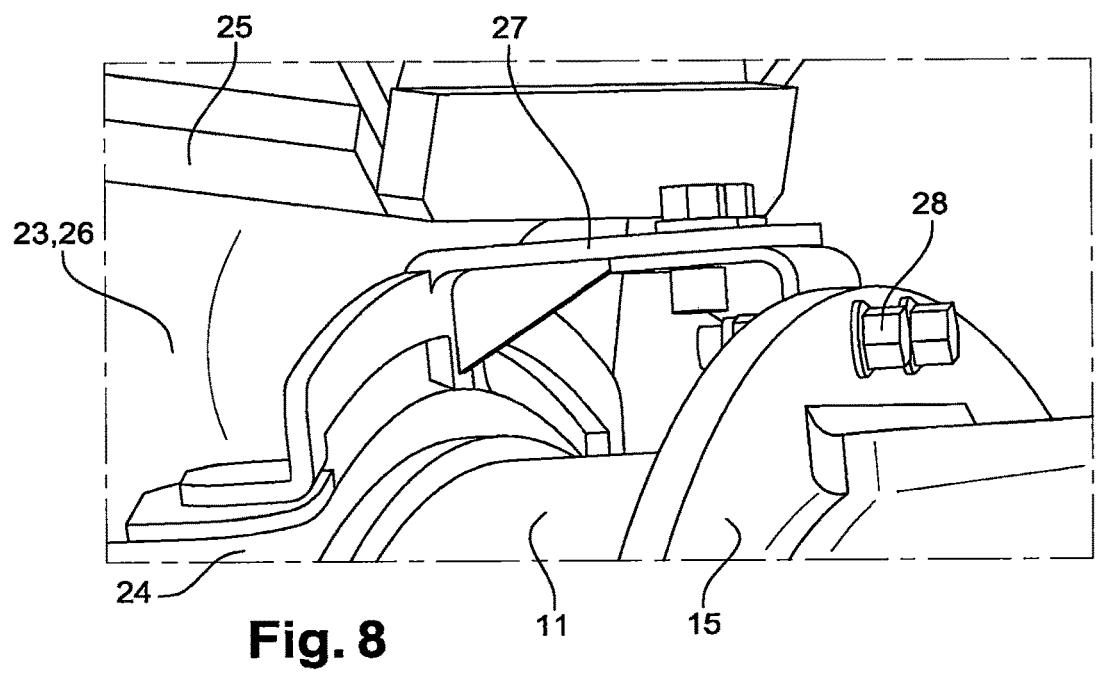

Besides, the radially outer end 25 of the protection member 23 is attached to the support 18 through second fastening members 29 (FIGS. 5 and 6). The second fastening members 29 are each generally U-shaped, having a first leg 30 intended to bear onto an edge of the beam 18 and a second leg 31 intended to rest on a radially outer end of the edge 25 of the protection member 23. A screw/nut system 32 goes through both legs 30, 31 and can be so tightened as to bring the two legs 30, 31 closer to one another and thus press the radially outer end 25 of the protection member 23 onto the radially internal surface of the beam 18.

Two second fastening members 29 (FIG. 5) are positioned at the upstream edge of the protection member 23, with two other second fastening members 29 (FIG. 6) being positioned at the downstream edge of the protection member 23.

The invention thus makes it possible to efficiently protect the auxiliary yoke 17 against a possible exposure to fire, so as to avoid any degradation of the mechanical characteristics of said auxiliary yoke 17. The safety function provided by the yoke 17 is thus unaffected.

Additionally, the flexibility of the protection member 23, in particular at the radially inner end 24, enables the introduction of an endoscope for maintenance purposes. The relative movements of the support relative to the yokes and the casing do not affect the thermal protection function of the protection member.

The invention has been disclosed in connection with the intermediate casing 3. Of course, it could also be applied to the exhaust casing 8 or other elements or parts of elements of a turbine engine. The invention can particularly be applied to any element with a generally cylindrical shape (an intermediate casing shroud, a hub, an exhaust casing), but also to an element possibly with a parallelepiped shape. The invention can be applied within the scope of various functions such as engine suspension, motor equipment (accessories, fluid tanks . . . ) suspension, suspension for handling or maintenance the engine and any other type of yoke suspensions, suspension implementing a load-bearing member such as a yoke, projecting from a flat or curved wall.

The invention claimed is:

1. A turbine engine, comprising:
   at least one element comprising:
   a wall;
   a main yoke attached to a beam;
   an auxiliary yoke clearance mounted on the beam, with said main yoke and said auxiliary yoke extending substantially perpendicularly to said wall, with said auxiliary yoke being adapted to take up stress in case of deformation of the element, breakage of the main yoke, or a combination thereof; and
   a thermal protection member surrounding the auxiliary yoke only, with said thermal protection member comprising a base flexibly supported on the wall of the element, with said base matching a shape of said wall and at least one covering part which surrounds said auxiliary yoke.

2. The turbine engine according to claim 1, wherein the element further comprises a second main yoke attached to the beam, and wherein the auxiliary yoke is positioned circumferentially between the main yokes.

3. The turbine engine according to claim 1, wherein the thermal protection member is attached to the wall by means of first fastening members.

4. The turbine engine according to claim 3, wherein the wall comprises an external surface and at least one annular flange which radially extends outwards from said external surface, with the first fastening members being attached to said external surface, said annular flange, or a combination thereof.

5. The turbine engine according to claim 1, comprising second fastening members adapted for attaching the thermal protection member on the beam.

6. The turbine engine according to claim 1, wherein the element is a casing, with said wall being an annular shroud.

7. The turbine engine according to claim 4, wherein the external surface is cylindrical.

8. The turbine engine according to claim 4, wherein the external surface is frustoconical.

* * * * *